(12) United States Patent
Ramaswamy et al.

(10) Patent No.: US 7,277,828 B2
(45) Date of Patent: Oct. 2, 2007

(54) METHODOLOGY FOR DESIGNING HIGH SPEED RECEIVERS BELOW A TARGET BIT-ERROR-RATE

(75) Inventors: Sridhar Ramaswamy, Plano, TX (US); Song Wu, Plano, TX (US); Bhavesh G. Bhakta, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 542 days.

(21) Appl. No.: 10/777,238

(22) Filed: Feb. 12, 2004

(65) Prior Publication Data

US 2005/0182807 A1    Aug. 18, 2005

(51) Int. Cl.
*G06F 15/00* (2006.01)
*G06F 19/00* (2006.01)
(52) U.S. Cl. .................................. 702/189; 702/181
(58) Field of Classification Search .............. 702/57, 702/64, 104, 181, 182, 183, 189; 375/296, 375/297
See application file for complete search history.

(56) References Cited

U.S. PATENT DOCUMENTS 6,798,843 B1 * 9/2004 Wright et al. ............... 375/296

* cited by examiner

*Primary Examiner*—Bryan Bui
(74) *Attorney, Agent, or Firm*—Alan K. Stewart; W. James Brady; Frederick J. Telecky, Jr.

(57) ABSTRACT

A method, and associated storage medium containing software and a system, includes extracting a time domain impulse response from parameters that characterize a communication channel, generating a probability distribution function (PDF) of an output voltage based on the impulse response; and computing a relationship between bit error rate and voltage margin based on the final probability distribution function. Generating the PDF of the output voltage may comprise one or more of the following acts: quantizing the impulse response into a plurality of quantized levels, assigning taps to the quantized levels and determining a number of taps assigned to each quantized level, determining allowable voltage levels for each quantized level, and determining a probability of occurrence of each allowable voltage level, determining a PDF for each voltage level; and convolving all of the PDFs for the various voltage levels to obtain the PDF of the output voltage.

14 Claims, 4 Drawing Sheets

METHODOLOGY FOR DESIGNING HIGH SPEED RECEIVERS BELOW A TARGET BIT-ERROR-RATE

BACKGROUND OF THE INVENTION

1. Technical Field

The present subject matter relates in general to a methodology for designing high speed receivers. More particularly, the present subject matter relates to verifying the bit-error rate of a receiver design at various stages of the design process.

2. Background Information

A high speed serial data link is generally required to meet a customer-specified bit-error-rate ("BER"). Usually, the BER of a receiver is tested and verified after the receiver has been designed and constructed. Having to re-work the design if the BER proves to be inadequate can be timely and costly. No direct method is known to exist to verify the BER of a receiver design at various stages of the design process.

BRIEF SUMMARY

In accordance with a preferred embodiment, a method, and associated storage medium containing software and a system, comprises extracting a time domain impulse response from parameters that characterize a communication channel, generating a probability distribution function (PDF) of an output voltage based on the impulse response; and computing a relationship between bit error rate and voltage margin based on the final probability distribution function. Generating the PDF of the output voltage may comprise one or more of the following acts: quantizing the impulse response into a plurality of quantized levels, assigning taps to the quantized levels and determining a number of taps assigned to each quantized level, determining allowable voltage levels for each quantized level, and determining a probability of occurrence of each allowable voltage level, determining a PDF for each voltage level; and convolving all of the PDFs for the various voltage levels to obtain the PDF of the output voltage. In some embodiments, the PDF is used to estimate the bit error rate of a receiver during the design process.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to." Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
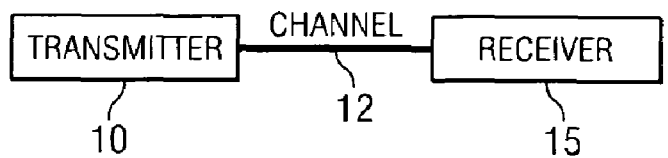
FIG. 1 shows a communication system in which a transmitter sends information to a receiver over a channel.

FIG. 1 shows a communication system in which a transmitter 10 sends information to a receiver 15 over a channel 12. The transmitter 10 and receiver 15 can be any type of device and the channel 12 represents the physical medium over which the information between transmitter and receiver is transmitted. In at least some embodiments, the transmitter 10, receiver 15, and channel 12 are implemented in a network switch in which digital data communications are routed between ports on the switch. The channel 12 may comprise a copper backplane. In general, the channel 12 distorts the transmitted data, particularly at higher frequencies. As such, the receiver 15 preferably has sufficient voltage sensitivity so as to accurately detect data bits transmitted to the receiver from the channel within a desired bit error rate ("BER"). The desired BER is application specific generally given the goals and objectives of the operator of the communication system. The receiver preferably is designed to achieve the desired BER given the particular channel 12 interconnecting the transmitter and receiver.

In accordance with the preferred embodiment of the invention, a methodology is disclosed for verifying that the receiver 15 will achieve the desired BER at various stages of the receiver's design. An assessment of the receiver's voltage sensitivity is determined at various stages of the design. In this disclosure, "sensitivity" refers to the minimum voltage increment a receiver is capable of resolving. For example, a sensitivity of 45 mv means that the receiver cannot resolve voltages in less than 45 mv increments. From the sensitivity value, the BER that the receiver will achieve for the determined sensitivity is computed. This computed BER may be higher than, lower than or equal to the desired BER and adjustments can be made to the design as necessary.

Figure 2:
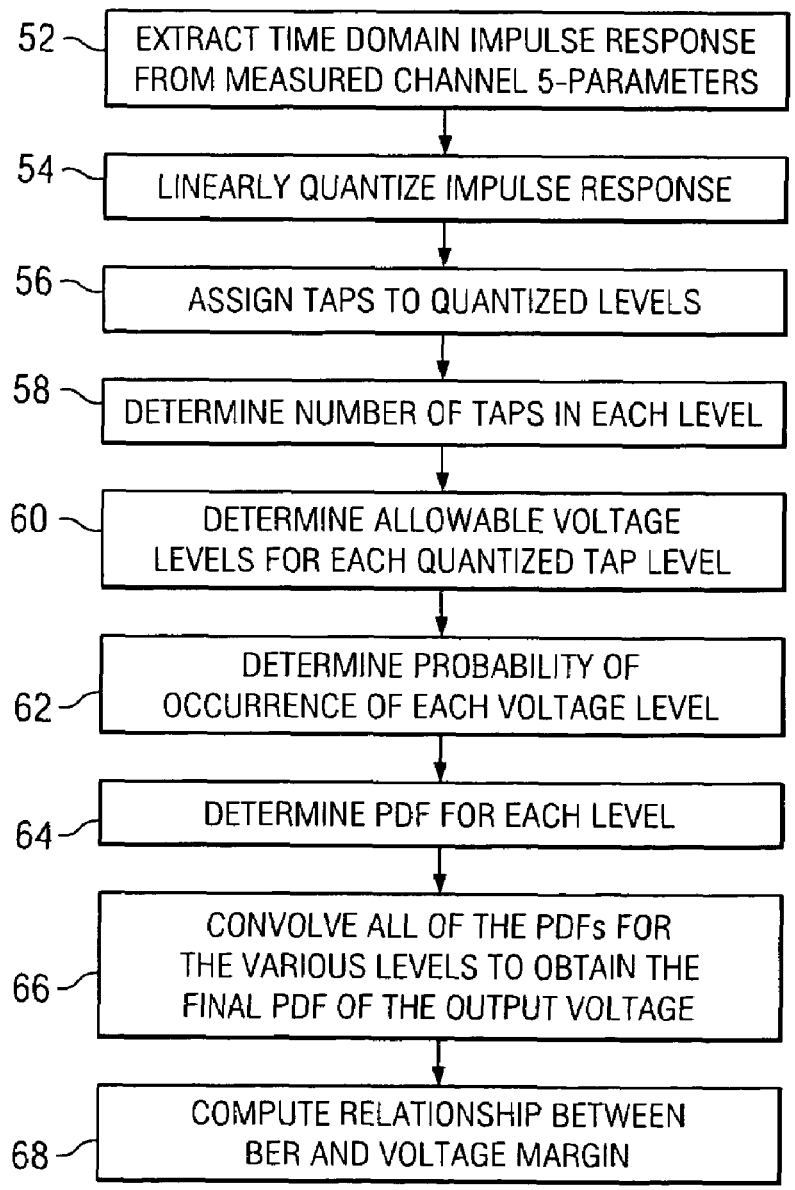
FIG. 2 shows an exemplary method of computing the relationship between bit error rate and receiver sensitivity.
Figure 3:
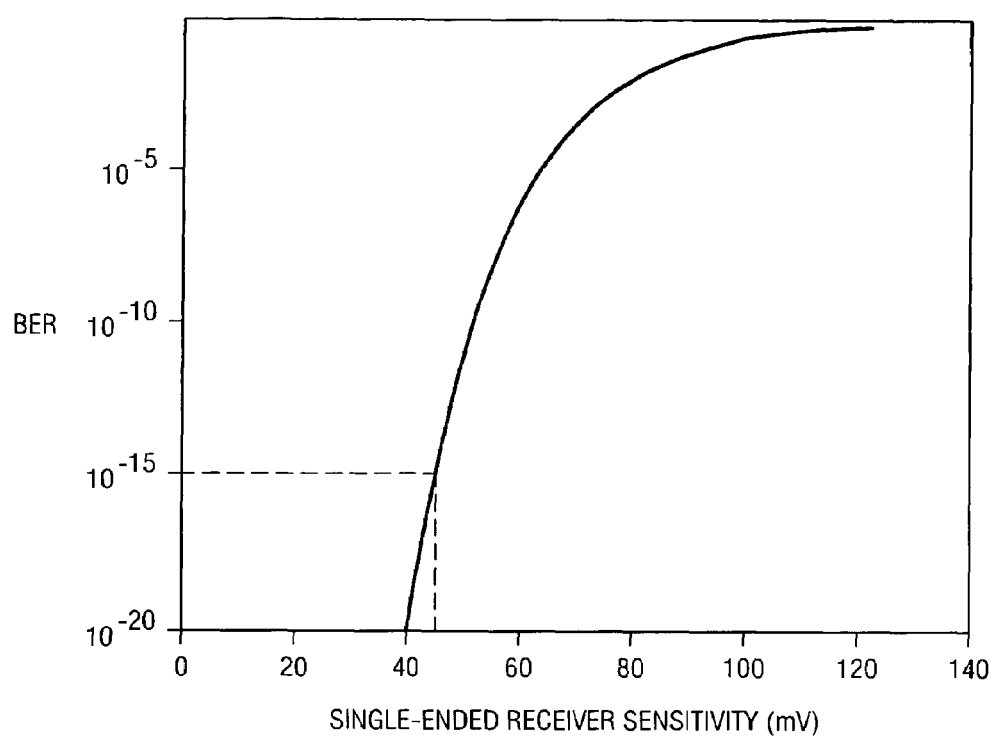
FIG. 3 illustrates an exemplary relationship between bit error rate and receiver sensitivity.

FIG. 2 illustrates a preferred method for determining the relationship between BER and receiver voltage sensitivity such as that shown in the example of FIG. 3. In FIG. 3, BER is on the vertical access and sensitivity is on the vertical access. In general, as can be seen by the curve in FIG. 3, as the receiver's sensitivity improves (becomes a lower value), the BER also improves. For example, for a sensitivity of 45 millivolts (mv), the BER is $10^{-15}$. That is, for a receiver that cannot resolve voltages in less than 45 mv increments, the receiver will receive one bit in error for every $10^{15}$ bits received.

Figure 4:
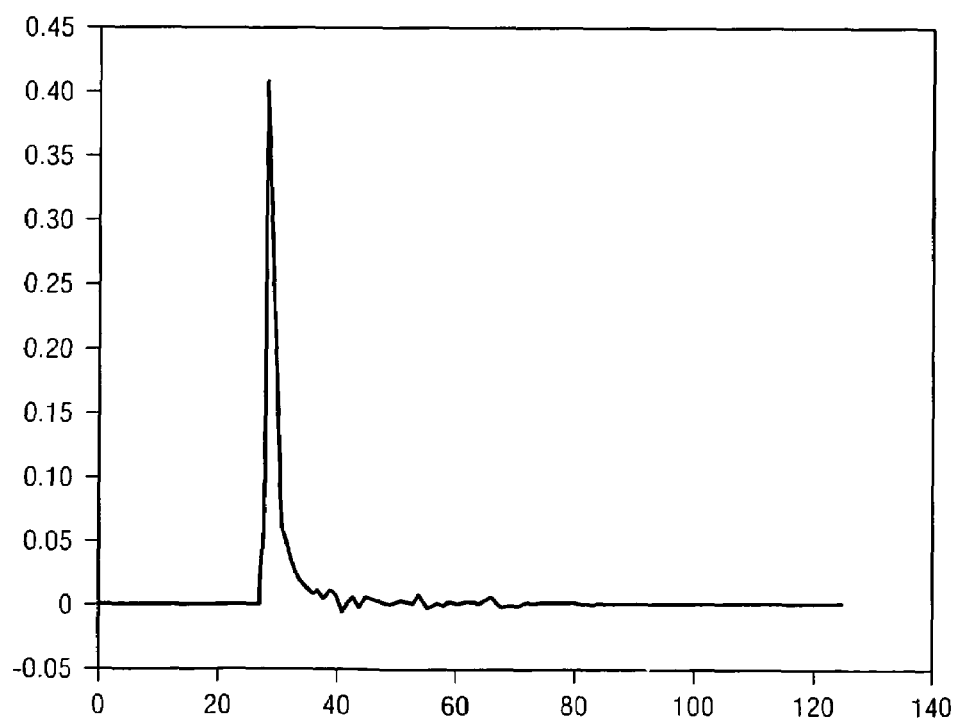
FIG. 4 shows an exemplary communication channel impulse response.

The order of the acts shown in FIG. 2 do not necessarily need to be performed in the order shown—other orders are within the scope of this disclosure. The method begins generally at 52 in which the time domain impulse response of the channel 12 is extracted from s-parameters that characterize the channel. The s-channel characterization of the channel 12 can be measured using a network analyzer as would be well known to those of ordinary skill in the art. Alternatively, a tool such as MATLAB can be used to generate an impulse response of the channel and a finite impulse response ("FIR") can be implemented in Verilog to model the channel. As such, an input impulse can be run through the Verilog modeled channel to compute the channel's impulse response. The time domain impulse response can be extracted in accordance with any suitable technique. An exemplary time domain impulse response is shown in FIG. 4.

Figure 5:
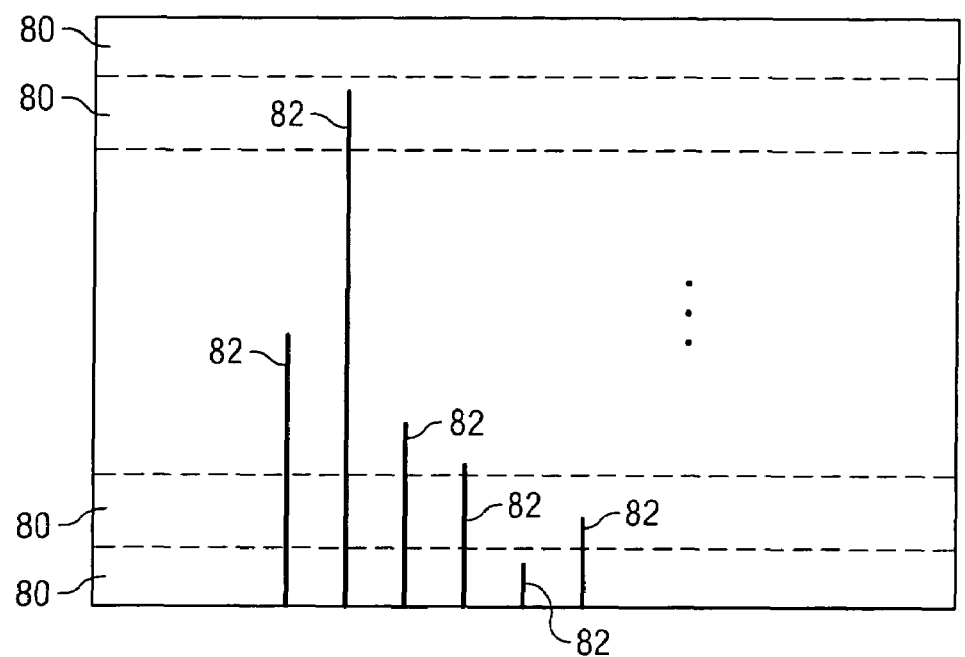
FIG. 5 shows illustrates an impulse response being quantized into a plurality of linearly spaced levels.
Figure 6:
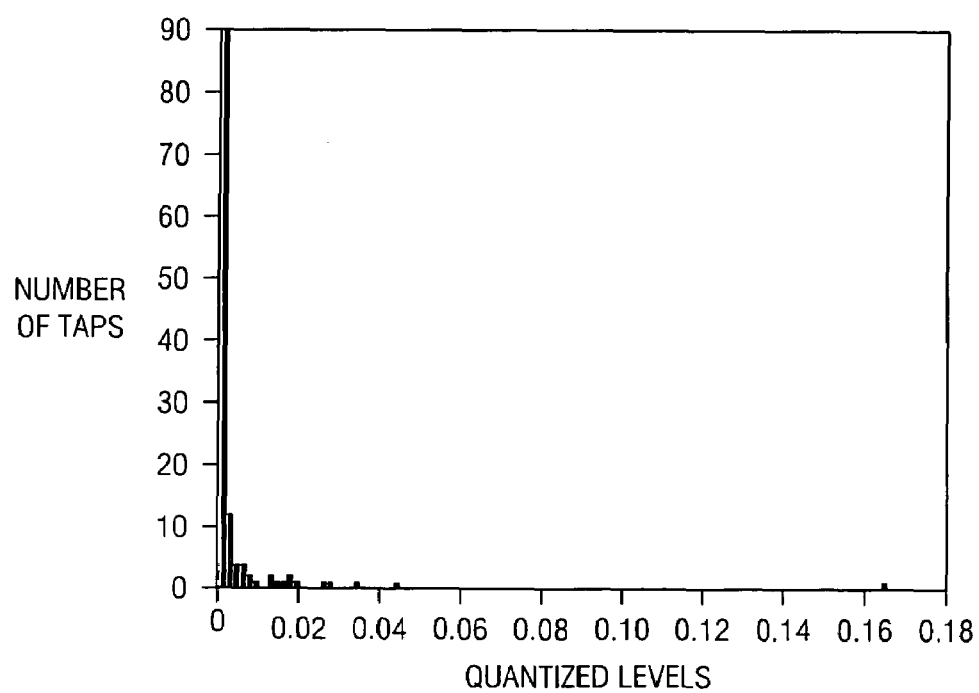
FIG. 6 shows an exemplary histogram of the number of taps assigned to each quantized level.
Figure 7:
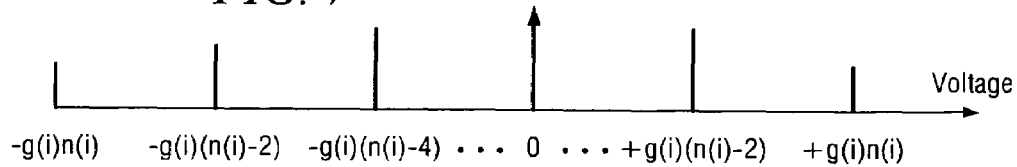
FIG. 7 shows the discrete voltage levels for a given tap level.

At 54, the time domain impulse response preferably is linearly quantized. FIG. 5 shows an example in which an impulse response is quantized into a plurality of linearly spaced levels 80. Then, at 56 the various taps 82 of the impulse response are assigned to the various quantized levels 80. As a result, a histogram, such as that shown in FIG. 6, can be constructed showing the number of taps 82 assigned to each quantized level Referring still to FIG. 2, once the taps have been assigned to different levels and a histogram is generated, the number of filter taps in each level are tallied (block 58). To determine the allowable voltage levels, all allowable bit sequences for a given level should be considered. Letting the various levels 80 be quantified as g(i) and each level g(i) having n(i) taps, where i ranges from 1 to the number of levels designated as Nf, then the allowable voltage levels are completely determined (block 60) by the n(i) input symbol values. As such, the lowest level is −g(i)*n(i) where all n(i) symbols take on a value of −1, while the maximum level is +g(i)*n(i) where all n(i) symbols take on a value of +1. Intermediate levels are obtained as one +1 and (n(i)−1)−1 which values leads to a voltage level −g(i)*(n(i)−2). FIG. 7 shows the discrete voltage levels for tap level g(i).

In block 62, the method comprises determining the profitability of occurrence of each voltage level. This act can be accomplished in a variety of ways. For instance, the probability of occurrence of each voltage level can be determined by the probability of occurrence of the particular bit sequence leading to that discrete voltage level. For example, the discrete level −g(i)*(n(i)−2) is the result of one +ve symbol and (n(i)−1)−ve symbols (symbols have +1 or −1 values). The number of possible combinations having m positive symbols out of n(i) symbols is given by $^mC_{n(i)}$.

Hence, the probability of having m positive symbols of n(i) symbols which can take either +ve or −ve values is given by:

$$\frac{C_{n(i)}^m}{2^{n(i)}} \quad (1)$$

In block 64, from the probabilities, the probability density function ("PDF") for each level is determined. In block 66, all of the PDFs for the various g(i) levels are convolved to obtain the final PDF of the output voltage. Finally, the relationship between BER and sensitivity can be computed from the following equation:

$$BER(v) = \int_{-\infty}^{T_{m-1}+v} P(y_n)dy_n + \int_{T_m-v}^{\infty} P(y_n)dy_n \quad (2)$$

The curve in FIG. 3 represents a set of solutions to equation (2).

In accordance with an alternative embodiment, equation (3) below is solved in place of blocks 54-66.

$$Vn = h_0 a_n + \sum_{k=1}^{K} h_k(a_{n-k} - \hat{a}_{n-k}) + \sum_{k=K+1}^{N} h_k a_{n-k} + \sum_{l}\sum_{i} g_i^l a_{n-1}^l \quad (3)$$

where the "h" values represent the impulse response, the "a" values represent the transmitted symbols, and $\hat{a}_{n-k}$ represents the receiver's sampler decision on symbol a. The value $g_I$ represents cross-talk from the I-th aggressor. The first term, $h_0 a_n$, is the primary received symbol. The second term, $$\sum_{k=1}^{K} h_k(a_{n-k} - \hat{a}_{n-k}),$$

is the inter-symbol interference ("ISI") with DFE correction. The third term, $$\sum_{k=K+1}^{N} h_k a_{n-k},$$

is the residual ISI. The fourth term, $$\sum_{l}\sum_{i} g_i^l a_{n-1}^l,$$

represents the contribution to the voltage from cross talk. For general pulse amplitude modulation ("PAM") systems, the transmission symbol can be expressed as:

$$a_i^l = 2m/(M-1)-1, \ m=0, \ldots, M-1 \quad (4)$$

and has equal probability $P(a_i^l)=1/M$ for each level. For example, in binary signaling, M=2 and $$a_i^l = \{-1,1\}, \ m=0,1$$

If $h_0$ represents the main tap of the signal path, $h_0 a_n$ would be the ideal noise free received voltage for transmission symbol $a_n$. For each transmitting level, the corresponding received signal levels are $V_m = h_o \cdot \{2m/(M-1)-1\}$, and the decision threshold between the m-th and (m+1)-th levels are $T_m = h_o \cdot \{(2m+1)/(M-1)-1\}$, m−0 ... M−2. Once the signal channel and cross talk channel are known, the probability $P(V_n)$ for received signal amplitude $V_n$ can be computed, and the probability for effective eye open (i.e., signal amplitude above the decision threshold) $|T_n - V_n|$ can also be derived.

Because there are N filter taps and M possible symbol values, there a total of MAN possible discrete outputs. Further, assuming that the input symbols have equal probability, each of these values occurs with a probability of 1/M^N.

Figure 8:
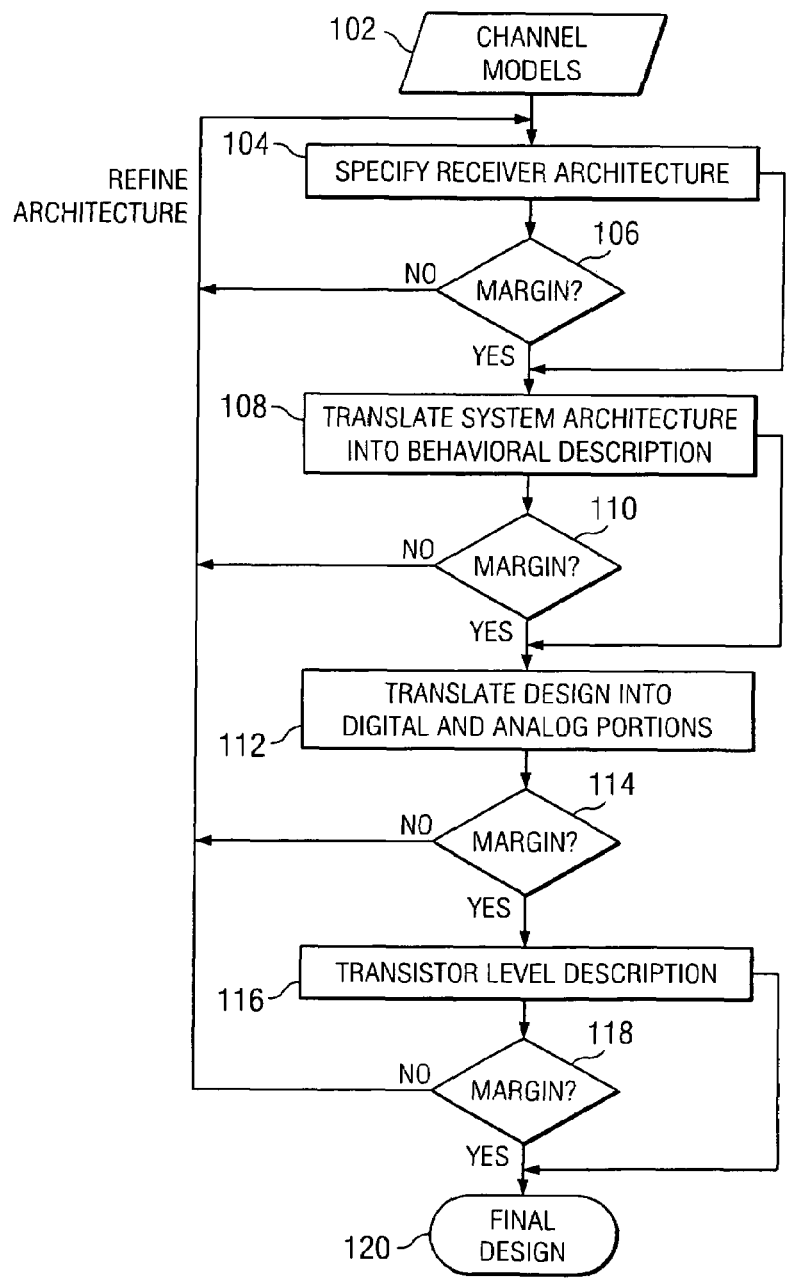
FIG. 8 shows an exemplary design process for a receiver during which the bit error rate of the design is evaluated at various stages of the design process.

Once the relationship between BER and sensitivity is determined, that relationship is used at various stages of the design process to re-assess the margin of the design. FIG. 8 shows an exemplary design process for a receiver. At 102, the communication channel 12 is modeled as described above. That model is used to compute the relationship between BER and sensitivity as described previously. The receiver design may undergo the four phases 104, 108, 112, and 116 as shown in FIG. 8, although in other embodiments, additional or different phases can be included. In phase 104, the receiver architecture is defined. Any suitable tool or mechanism for performing this act is acceptable such as by the use of MATLAB. In phase 108, the receiver architecture is translated into a behavioral description. Any suitable tool or mechanism for performing this act is acceptable such as by the use of VERILOG. In phase 112, the receiver design is then translated into mixed digital and analog portions. In phase 116, a transistor level description is specified for the design and the design is considered complete at 120.

For any or all of the design phases shown, an assessment preferably is made as to whether the receiver has sufficient sensitivity margin given a specified BER and channel 12. As such, for each phase, the expected sensitivity of the receiver is determined. The sensitivity determination can be made in accordance with a variety of techniques and is generally specific to the particular design phase at issue. For example, how the sensitivity is determined for phase 104 may differ from the determination for phases 108, 112, and 116. Additional detail regarding sensitivity determinations for each phase will be provided below. Regardless of how the sensitivity is determined, the sensitivity value is used in the BER-sensitivity relationship. As mentioned above, if at a particular phase of receiver's design, the receiver is to have a sensitivity of 45 mv, then, referring to FIG. 3, such a receiver would be determined to have a BER of $10^{-15}$.

If the BER determined for a particular phase of a receiver's design complies with the target BER, then the design process continues to the next phase. However, if the BER at a particular phase of the design does not comply with the target BER (i.e., the error rate is higher than what is desired for the receiver), then the architecture of the receiver can be refined at, for example, phase 104. A failure of the BER to achieve the specified goal for phases 112 and 116 may result in a return to phase 104 or any other prior phase. For example, if the assessment of margin at 118 results in a determination that the BER is insufficient, then the receiver's design can be refined by returning to any of phases 104, 108, and 112 as is desired by the system designer.

At phase 104, sensitivity preferably is determined by estimating the sensitivity based on knowledge of receiver architecture. At phases 108, 112, and 116, sensitivity preferably is determined via Monte Carlo simulations. For transistor level verification, a Nanosim-Integration-VCS ("NIV") simulator, or comparable system, can be used to run mixed analog (transistor) and digital (Verilog) simulations. In such a simulation a behavioral analog-to-digital converter ("ADC") and a functional digital-to-analog converter ("DAC") can be created to move analog signals across the interface as digital signals with the required precision because the Synopsys NIV flow does not allow analog signals to pass across the Verilog to transistor netlist interface.

While the preferred embodiments of the present invention have been shown and described, modifications thereof can be made by one skilled in the art without departing from the spirit and teachings of the invention. For example, any one or more of the preceding sense amplifier improvements can be combined together as desired. The embodiments described herein are exemplary only, and are not intended to be limiting. Accordingly, the scope of protection is not limited by the description set out above.

What is claimed is:

1. A computer accessible storage medium containing software that, when executed by a processor, causes the processor to:
    extract a time domain impulse response of a communication channel from parameters that characterize the communication channel;
    generate a probability distribution function (PDF) of an output voltage based on the impulse response; and
    compute a relationship between bit error rate and voltage margin based on the probability distribution function.

2. The storage medium of claim 1 wherein the software causes the processor to generate the PDF of the output voltage by causing the processor to quantize the impulse response into a plurality of quantized levels.

3. The storage medium of claim 2 wherein the software causes the processor to generate the PDF of the output voltage by further causing the processor to assign taps to the quantized levels and determine a number of taps assigned to each quantized level.

4. The storage medium of claim 3 wherein the software causes the processor to generate the PDF of the output voltage by further causing the processor to determine allowable voltage levels for each quantized level.

5. The storage medium of claim 4 wherein the software causes the processor to generate the PDF of the output voltage by further causing the processor to determine a probability of occurrence of each allowable voltage level, determine a PDF for each voltage level; and convolve all of the PDFs for the various voltage levels to obtain the PDF of the output voltage.

6. The storage medium of claim 5 wherein the software further causes the processor to permit a user to estimate a voltage margin for a receiver and to use the relationship between bit error rate and voltage margin to determine a corresponding bit error rate.

7. The storage medium of claim 1 wherein the software further causes the processor to permit a user to estimate a voltage margin for a receiver and, using the relationship between bit error rate and voltage margin, to determine a corresponding bit error rate.

8. A system, comprising:
    a processor;
    a storage device accessible to the processor and on which software is stored, the software adapted to be executed by the processor to cause the processor to:

extract a time domain impulse response of a communication channel from parameters that characterize the communication channel;

generate a probability distribution function (PDF) of an output voltage based on the impulse response; and compute a relationship between bit error rate and voltage margin based on the probability distribution function.

9. The system of claim 8 wherein the software causes the processor to generate the PDF of the output voltage by causing the processor to quantize the impulse response into a plurality of quantized levels.

10. The system of claim 9 wherein the software causes the processor to generate the PDF of the output voltage by further causing the processor to assign taps to the quantized levels and determine a number of taps assigned to each quantized level.

11. The system of claim 10 wherein the software causes the processor to generate the PDF of the output voltage by further causing the processor to determine allowable voltage levels for each quantized level.

12. The system of claim 11 wherein the software causes the processor to generate the PDF of the output voltage by further causing the processor to determine a probability of occurrence of each allowable voltage level, determine a PDF for each voltage level; and convolve all of the PDFs for the various voltage levels to obtain the PDF of the output voltage.

13. The system of claim 12 wherein the software further causes the processor to permit a user to estimate a voltage margin for a receiver and to use the relationship between bit error rate and voltage margin to determine a corresponding bit error rate.

14. The system of claim 8 wherein the software further causes the processor to permit a user to estimate a voltage margin for a receiver and, using the relationship between bit error rate and voltage margin, to determine a corresponding bit error rate.

* * * * *